(12) United States Patent
Itagaki

(10) Patent No.: US 7,443,624 B2
(45) Date of Patent: Oct. 28, 2008

(54) METHOD FOR RECORDING DATA FRESHNESS DEGREES BY A TAPE DRIVE

(75) Inventor: Hiroshi Itagaki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 10/508,872

(22) PCT Filed: Feb. 13, 2003

(86) PCT No.: PCT/JP03/01516

§ 371 (c)(1),
(2), (4) Date: Sep. 23, 2004

(87) PCT Pub. No.: WO03/083866

PCT Pub. Date: Oct. 9, 2003

(65) Prior Publication Data
US 2007/0177293 A1    Aug. 2, 2007

(30) Foreign Application Priority Data
Apr. 3, 2002   (JP) .............................. 2002-100863

(51) Int. Cl.
*G11B 5/09* (2006.01)
(52) U.S. Cl. .......................................... 360/53; 360/48
(58) Field of Classification Search ........................ None
See application file for complete search history.

(56) References Cited

U.S. PATENT DOCUMENTS

| 6,282,040 B1 * | 8/2001 | Bartlett ........................ 360/48 |
| 6,288,862 B1 * | 9/2001 | Baron et al. .................. 360/55 |
| 6,693,755 B2 * | 2/2004 | Maple et al. .................. 360/53 |
| 6,883,122 B2 * | 4/2005 | Maple et al. .................. 714/54 |

FOREIGN PATENT DOCUMENTS

EP   1508900 A1 *   2/2005

* cited by examiner

Primary Examiner—Andrea Wellington
Assistant Examiner—Dan I Davidson
(74) Attorney, Agent, or Firm—Ingrassia Fisher & Lorenz, P.C.

(57) ABSTRACT

A method for recording data freshness degrees by a tape drive is disclosed. During the recording of a set of data and a data freshness degree associated with the set of data a tape recording medium, a determination is made as to whether or not a fault occurs during the recording. In response to a determination that a fault occurs during the recording, a data freshness degree of data within a faulty portion on the tape recording medium is obtained. The data freshness degree of the set of data is then immediately recorded before the faulty portion on the tape recording medium. The data freshness degree is higher than the data freshness degree of data within the faulty portion.

8 Claims, 9 Drawing Sheets

METHOD FOR RECORDING DATA FRESHNESS DEGREES BY A TAPE DRIVE

BACKGROUND OF THE INVENTION

1. Technical Field

The present invention relates to storage devices in general, and, in particular, to tape drives. Still more particularly, the present invention relates to a method for recording data freshness degrees by a tape drive.

2. Description of Related Art

When recording new data on a tape recording medium, a tape drive can record data freshness degrees on the tape recording medium along with the associated data. Data freshness degrees indicate the degree of newness of the new data to be recorded with respect to the previously recorded old data. The tape drive can perform recording so that the data freshness degrees become monotonically increasing in accordance with positions on the tape recording medium.

When a fault occurs in which the value of a data freshness degree to be written is erroneous, the entire tape recording medium is scanned to identify the highest data freshness degree value associated with the previously recorded old data, and then a data freshness degree value higher than the identified highest value is recorded in association with the new data. The scanning operation of the entire tape recording medium is typically very time-consuming.

The present disclosure provides a tape drive that can overcome the above-mentioned problem.

SUMMARY OF THE INVENTION

In accordance with a preferred embodiment of the present invention, during the recording of a set of data and a data freshness degree associated with the set of data a tape recording medium, a determination is made as to whether or not a fault occurs during the recording. In response to a determination that a fault occurs during the recording, a data freshness degree of data within a faulty portion on the tape recording medium is obtained. The data freshness degree of the set of data is then immediately recorded before the faulty portion on the tape recording medium. The data freshness degree is higher than the data freshness degree of data within the faulty portion.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
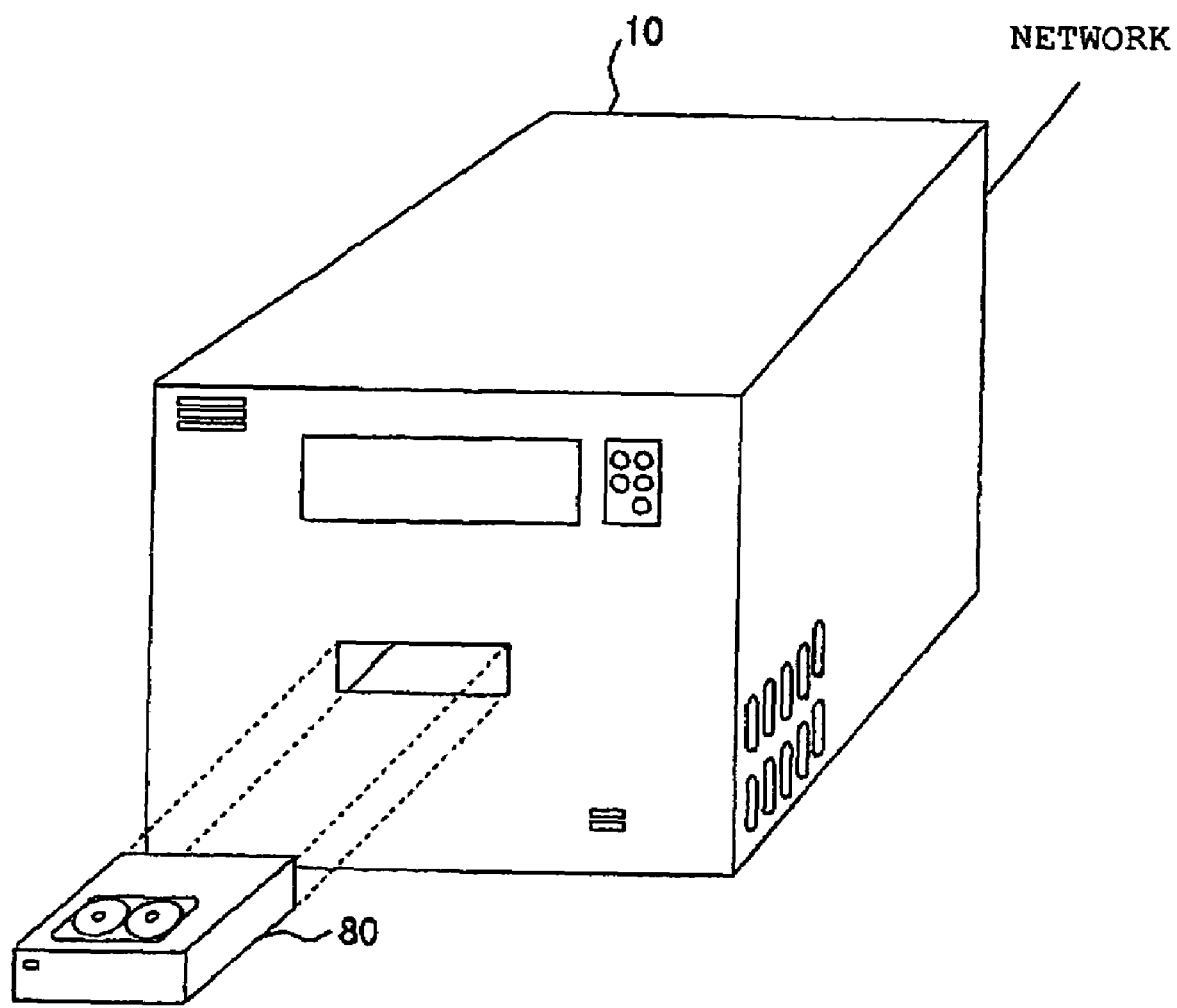
FIG. 1 is a graphical illustration of a tape drive.

Referring now to the drawings and in particular to FIG. 1, there is depicted a graphical illustration of a tape drive. As shown, a tape drive 10 is connected to other computers or devices through a network. The input/output (I/O) connection to the network can be, for example, IDE, SCSI interfaces, USB, Fiber Channel, etc. A tape recording medium 80 can be loaded into tape drive 10. Tape drive 10 is preferably a tape drive based on the Linear Tape Open™ (LTO) specifications. Tape recording medium 80 is preferably a tape recording medium based on the LTO specifications. The LTO specifications are open-format specifications jointly developed by Hewlett-Packard, International Business Machines and Seagate.

Tape drive 10 may overwrite data that have been already recorded on tape recording medium 80. Tape drive 10 acquires a written data freshness degree from a written freshness degree storing section located on tape recording medium 80. The data freshness degree indicates how new the new data is with respect to the previously recorded old data. Using the written data freshness degree, tape drive 10 records a data freshness degree on tape recording medium 80, in association with the new data to be recorded. When a fault occurs during the recordation of the written data freshness degree on tape recording medium 80, tape drive 10 skips the faulty portion and continues recording. As such, tape drive 10 can record data while making demarcation between a faulty portion (where the previously recorded data remains) and new data.

In accordance with a preferred embodiment of the present invention, when tape drive 10 determines that a data freshness degree to be used in overwrite recording is erroneous, tape drive 10 can make demarcation between a faulty portion (where the previously recorded data remains) and new data. In other words, when a write fault occurs during a recording session on tape recording medium 80, tape drive 10 performs recording on tape recording medium 80 so that the faulty portion will be distinguishable.

Figure 2:
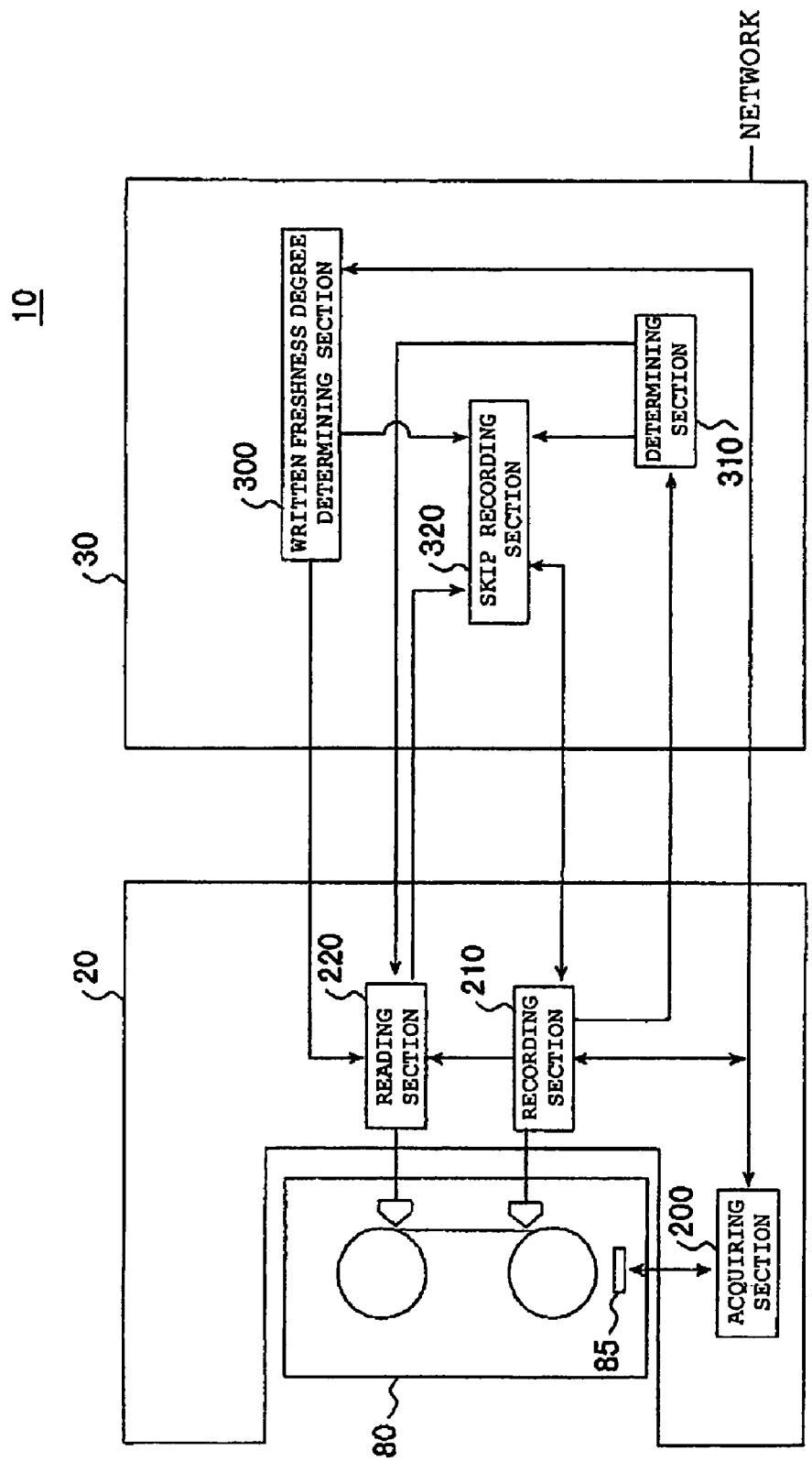
FIG. 2 is a block diagram of a tape drive, in accordance with a preferred embodiment of the present invention.

FIG. 2 is a block diagram of tape drive 10. Tape drive 10 includes a drive unit 20 and a control unit 30. Drive unit 20 includes an acquiring section 200, a recording section 210 and a reading section 220. In FIG. 2, tape recording medium 80 is mounted in drive unit 20. Tape recording medium 80 has a written freshness degree storing section 85. Written freshness degree storing section 85 stores a written data freshness degree and its duplicate. In other words, written freshness degree storing section 85 redundantly stores the written data freshness degree. Written freshness degree storing section 85 can be a non-volatile recording medium, such as a flash memory or a static random access memory (SRAM).

As an initial operation when tape recording medium 80 is being mounted, an acquiring section 200 acquires a written data freshness degree and a duplicate written data freshness degree from written freshness degree storing section 85. Acquiring section 200 then sends the written data freshness degree and the duplicate written data freshness degree to a written freshness degree determining section 300. Acquiring section 200 also sends the written data freshness degree to a recording section 210.

Although the above-mentioned initial operation of acquiring section 200 describes when tape recording medium 80 is being mounted, the timing of such operation is not limited to when tape recording medium 80 is being mounted. For example, such operation may be carried out when tape drive 10 is being activated, when the whole tape drive 10 is being reset, when the power to tape drive 10 is being turned on, or when a new data group starts to be recorded.

Acquiring section 200 executes the following operations every time recording section 210 records data on a tape recording medium. Acquiring section 200 receives a data freshness degree from recording section 210. Acquiring section 200 then duplicates the data freshness degree. Acquiring section 200 records the data freshness degree and the copy thereof on written freshness degree storing section 85, as a written data freshness degree and a duplicate written data freshness degree, respectively. The data freshness degree is preferably Write Pass (WP) information based on the LTO specifications.

Recording section 210 receives written data freshness degrees from acquiring section 200 and a skip recording section 320. When recording section 210 receives a written data freshness degree from skip recording section 320, recording section 210 performs recording using the received written data freshness degree. When recording section 210 does not receive a written data freshness degree from skip recording section 320, recording section 210 performs recording using a written data freshness degree received from acquiring section 200. Using any of the above-mentioned written data freshness degrees, recording section 210 records a data freshness degree on tape storage medium 80, in association with new data to be newly recorded. In addition, recording section 210 sends a data recording state (i.e., information about whether or not the recording has succeeded, information about whether or not data to be written have been finished, a last-recorded data freshness degree, or the like) to each of reading section 220, a determining section 310 and skip recording section 320. Furthermore, every time recording section 210 records a data freshness degree, recording section 210 sends a data freshness degree to acquiring section 200.

During operation, reading section 220 may receive a written freshness degree error notification from written freshness degree determining section 300, which indicates that the written data freshness degree is erroneous. Reading section 220 may also receive a fault notification from determining section 310, which indicates that a fault occurs in recording on tape recording medium 80. If reading section 220 receives a written freshness degree error notification and a fault notification, then reading section 220 reads a faulty portion freshness degree, which is the data freshness degree of a faulty portion on tape recording medium 80. Reading section 220 then sends the faulty portion freshness degree to skip recording section 320.

Reading section 220 also receives a data recording state from recording section 210. Reading section 220 then analyzes the data recording state and thereby determines whether or not the last of data to be sequentially recorded by recording section 210 has been recorded. When the last of data to be sequentially recorded by recording section 210 has been recorded, reading section 220 reads an end portion freshness degree, which is the data freshness degree of a predetermined area ahead of a location where the last data in question is recorded on tape recording medium 80. Reading section 220 then sends the end portion freshness degree to skip recording section 320. The predetermined area ahead of the location where the data have been recorded is an area where a search for a higher data freshness degree is continued because there is still a possibility of the presence of new data after tape drive 10 has read the last-recorded data from tape reading medium 80.

As an initial operation when tape recording medium 80 is being mounted, written freshness degree determining section 300 receives a written data freshness degree and a duplicate written data freshness degree from acquiring section 200. Written freshness degree determining section 300 determines whether or not the written data freshness degree is erroneous by comparing the written data freshness degree and the duplicate written data freshness degree. If the written data freshness degree and the duplicate written data freshness degree are different from each other, written freshness degree determining section 300 may conclude that the written data freshness degree is erroneous and sends a written freshness degree error notification to each of reading section 220 and skip recording section 320. Although, in the present embodiment, written freshness degree determining section 300 concludes that a written data freshness degree is erroneous when the written data freshness degree and its duplicate written data freshness degree are different from each other, it is understood by those skilled in the art that the method of determining the erroneousness of a written data freshness degree is not limited to such embodiment. For example, written freshness degree determining section 300 may determine that a written data freshness degree is erroneous when the written data freshness degree cannot be acquired even after tape recording medium 80 has been mounted.

After receiving a data recording state from recording section 210, determining section 310 analyzes the data recording state and thereby determines whether or not a fault occurs in recording on tape recording medium 80 performed by recording section 210. If determining section 310 concludes that a fault has occurred in recording on tape recording medium 80, determining section 310 then sends a fault notification to each of reading section 220 and skip recording section 320.

Skip recording section 320 may receive a written freshness degree error notification from written freshness degree determining section 300, and a fault notification from determining section 310. After receiving a written freshness degree error notification and a fault notification, skip recording section 320 then receives a faulty portion freshness degree from reading section 220. Thereafter, skip recording section 320 receives a data recording state from recording section 210. Skip recording section 320 analyzes the data recording state and thereby specifies a data freshness degree recorded immediately before the faulty portion prior to the occurrence of the fault. Subsequently, skip recording section 320 determines whether or not the data freshness degree recorded immediately before the faulty portion is higher than the faulty portion freshness degree. When skip recording section 320 determines that the data freshness degree recorded immediately before the faulty portion is higher than the faulty portion freshness degree, skip recording section 320 retains the data freshness degree recorded immediately before the faulty portion without changing it. When skip recording section 320 determines that the data freshness degree recorded immediately before the faulty portion is not higher than the faulty portion freshness degree, skip recording section 320 sends a new data freshness degree that is higher than the faulty portion freshness degree to recording section 210.

Subsequently, skip recording section 320 sends recording section 210 a data freshness degree that is equal to or higher than the data freshness degree just recorded immediately before the faulty portion, and allows recording section 210 to record the sent data freshness degree immediately before the faulty portion. As such, skip recording section 320 allows recording section 210 to record a data freshness degree that is higher than a faulty portion freshness degree immediately before a faulty portion. Accordingly, skip recording section 320 enables data and data freshness degrees to be continuously recorded in portions subsequent to the faulty portion on tape recording medium 80.

When skip recording section 320 receives an end portion freshness degree from reading section 220, skip recording section 320 sends a data freshness degree that is higher than the end portion freshness degree to recording section 210, as a written data freshness degree. Skip recording section 320 then allows the data freshness degree, which is higher than the data freshness degree of a predetermined area ahead of a location where the last data is written, to be recorded in association with the data. In such a way, skip recording section 320 can record new valid data while making it distinguishable from old data that have been already recorded ahead of the previous data.

Although the above-mentioned initial operation of skip recording section 320 includes the time when tape recording medium 80 is being mounted, the timing of such operation is not limited to when tape recording medium 80 is being mounted. For example, such operation may be carried out when tape drive 10 is being activated, when tape drive 10 is being reset, when the power to tape drive 10 is being turned on, or when a new data group starts to be recorded.

Figure 3:
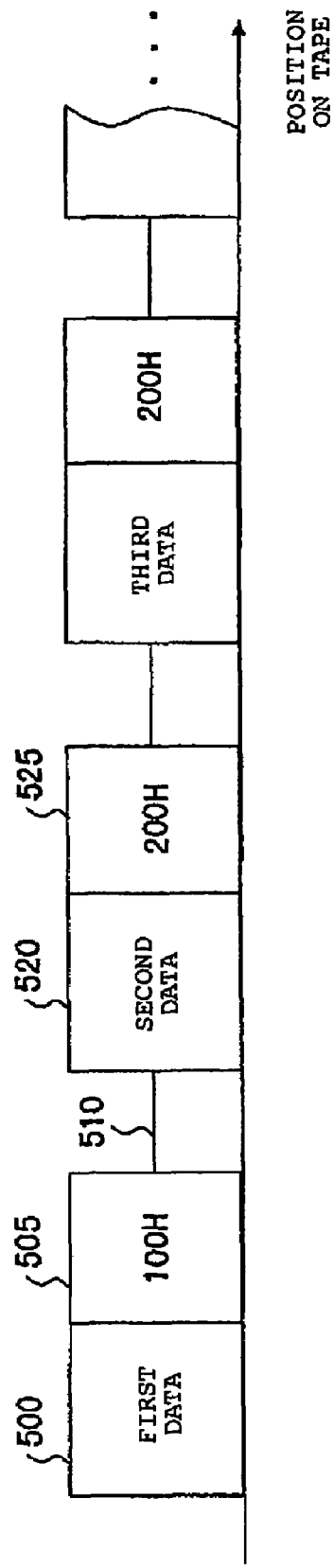
FIG. 3 shows an example of data to be recorded by a tape recording section.

FIG. 3 shows an example of data to be recorded by recording section 210. The horizontal axis represents the position on a tape recording medium. FIG. 3 shows that first data 500, a first data freshness degree 505, a separator 510, second data 520, and a second data freshness degree 525 are sequentially recorded on the tape recording medium. As mentioned above, recording section 210 records a data freshness degree on a recording medium along with the associated new data. For example, in FIG. 3, recording section 210 records a value of 100 in hexadecimal, which is first data freshness degree 505, in association with first data 500. After recording first data 500 and first data freshness degree 505, recording section 210 records separator 510, which indicates a boundary between data groups. Subsequently, recording section 210 records a value of 200 in hexadecimal, which is second data freshness degree 525, in association with second data 520. Thereafter, recording section 210 continue to record data and data freshness degrees until data to be recorded are finished, or until tape recording medium 80 ends.

Recording section 210 sequentially records data freshness degrees so that the data freshness degrees become monotonically increasing in accordance with positions on a tape recording medium. In other words, recording section 210 records data and data freshness degrees so that a data freshness degree associated with the newly recorded data is higher than a data freshness degree associated with the previously recorded data.

Figure 4:
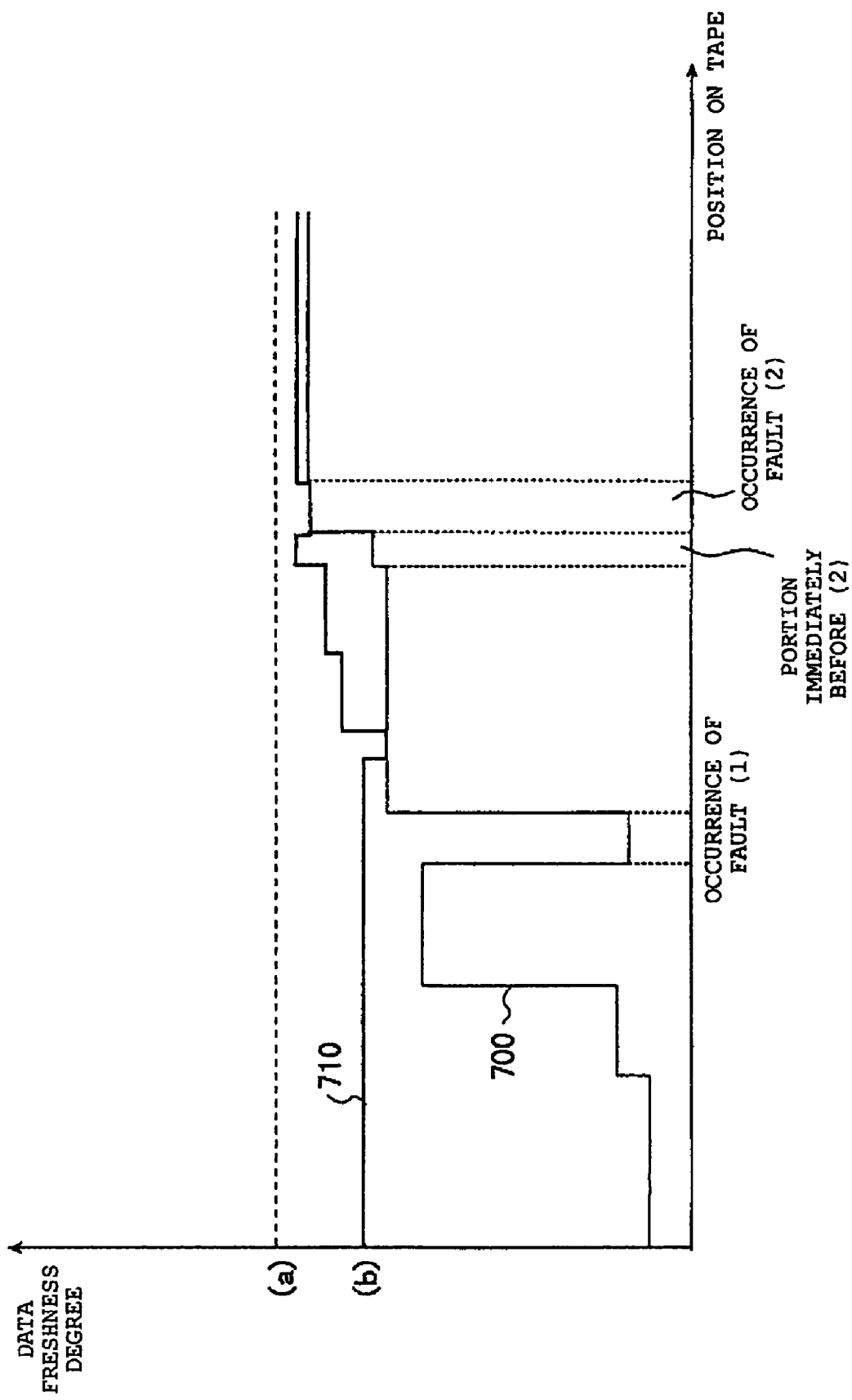
FIG. 4 shows examples of data freshness degrees that the tape drive from FIG. 1 records when a fault occurs in recording.

FIG. 4 shows examples of the data freshness degree that tape drive 10 records when a fault occurs during recording. The horizontal axis represents the position on a tape recording medium. The vertical axis represents the data freshness degree. FIG. 4 shows a scenario when tape drive 10 first records data and its associated data freshness degree and then performs overwrite recording in the same positions on the tape recording medium where the data and the data freshness degree have been recorded. First, as indicated by a first graph 700, tape drive 10 sequentially records data freshness degrees. For example, at a portion of occurrence of a fault (1), tape drive 10 skips the faulty portion and continues to record in portions ahead of the faulty portion. Therefore, in the portion of the occurrence of a fault (1), tape drive 10 leaves a data freshness degree, which was recorded since before the data freshness degree indicated by first graph 700 are recorded, as is. Accordingly, when reading data, tape drive 10 can recognize that old data is stored in the portion of the occurrence of a fault (1). After the data freshness degrees indicated by first graph 700 have been stored, written freshness degree storing section 85 stores a written data freshness degree of a value (a), which is a data freshness degree equal to or higher than the highest value of first graph 700. Tape drive 10 then uses the written data freshness degree indicated by the value (a) in the next writing.

Next, tape drive 10 performs overwrite recording at the same positions on the tape where the above-described recording has been performed.

In the example shown in FIG. 4, it is assumed that written freshness degree storing section 85 has stored a value (b), which is an erroneous written data freshness degree. In other words, it is assumed that the value of a written data freshness degree to be stored in written freshness degree storing section 85 has been changed since recording section 210 recorded the data freshness degrees indicated by first graph 700. Tape drive 10 records data freshness degrees indicated by a second graph 710, by performing overwrite recording on the data freshness degrees indicated by the first graph 700. At a portion of occurrence of a fault (2), tape drive 10 skips the portion of the occurrence of a fault (2) and continues recording. However, if tape drive 10 simply skipped the portion of the occurrence of a fault (2) and continued recording, tape drive 10 cannot record data freshness degrees correctly. In other words, the data freshness degree (e.g., a value of first graph 700) of the data that has already been recorded on a tape recording medium will be higher than the data freshness degree of new data. Therefore, if the new data is continuously recorded in a manner of skipping the portion where the data has been recorded, the data freshness degree of data to be recorded after the skipping will be lower than the data freshness degree of the portion skipped due to the occurrence of a fault. As a result, the new data recorded after the skipping will be regarded as old data when the data are being read out.

Hence, in the present embodiment, tape drive 10 records a data freshness degree that is higher than the data freshness degree of the portion of the occurrence of a fault (2) immediately before the portion of the occurrence of a fault (2), as shown in FIG. 4. Using the newly recorded data freshness degree, tape drive 10 skips the portion of the occurrence of a fault (2) and continues to record. Even when a written data freshness degree is erroneous, tape drive 10 can correctly record a data freshness degree to make demarcation between previously recorded data and new data.

Figure 5:
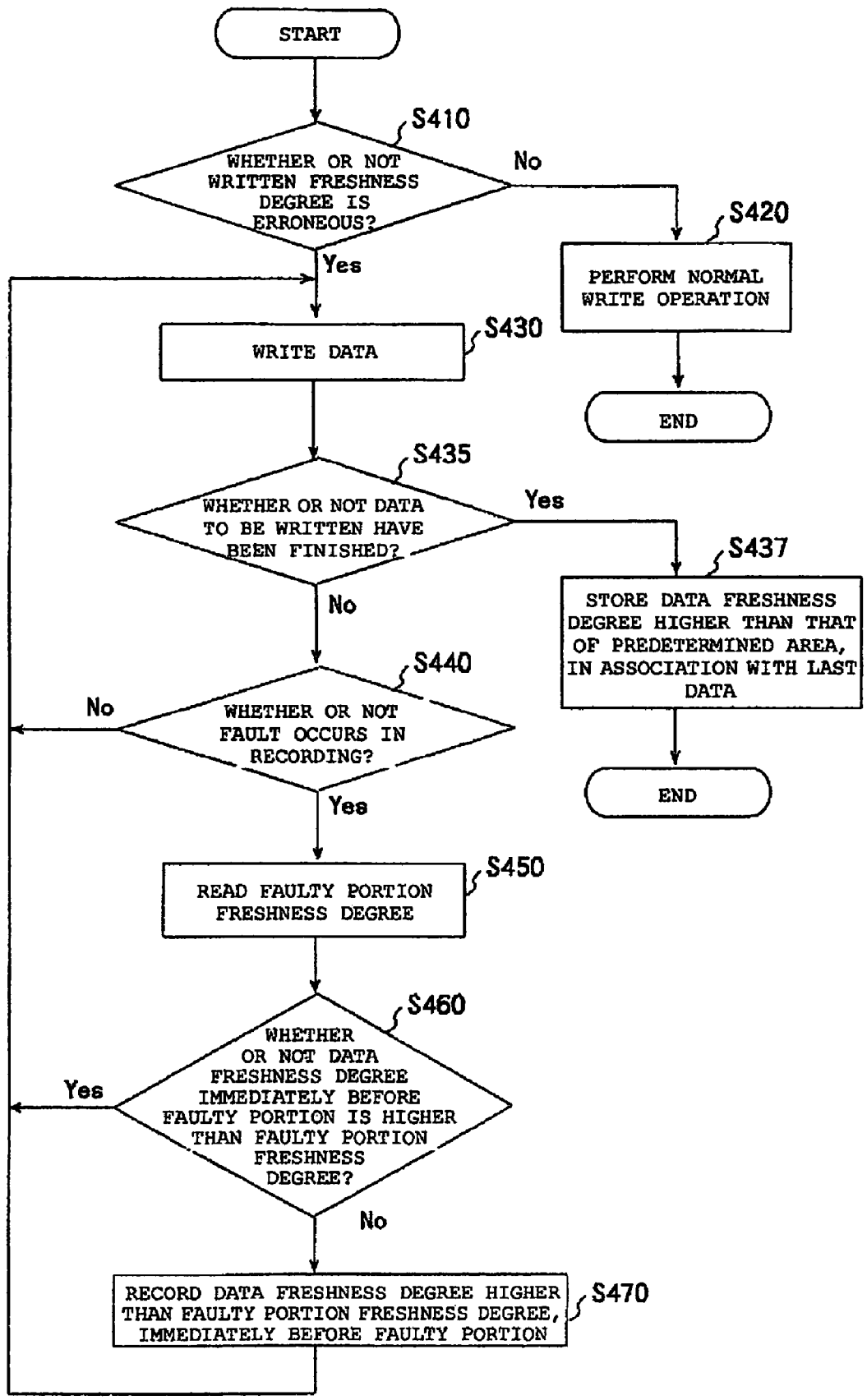
FIG. 5 is a flowchart of a method for recording data freshness degrees, in accordance with a preferred embodiment of the present invention.

FIG. 5 is a flowchart of a method for recording data freshness degrees by tape drive 10, in accordance with a preferred embodiment of the present invention. Written freshness degree determining section 300 determines whether or not a written data freshness degree is erroneous (S410). If the written data freshness degree is not erroneous (S410: NO), tape drive 10 performs a normal write operation (S420).

Otherwise, if the written data freshness degree is erroneous (S410: YES), tape drive 10 repeats the following operations. Recording section 210 records data and its associated data freshness degree (S430). More specifically, recording section 210 uses the written data freshness degree that has already been determined to be erroneous as an initial value of the data freshness degree. Alternatively, recording section 210 may use the duplicate written data freshness degree. Recording section 210 then sequentially records data freshness degrees so that the data freshness degrees become monotonically increasing in accordance with positions on the tape recording medium. Recording section 210 may use a predetermined value as the initial value of the written data freshness degree. Subsequently, reading section 220 determines whether or not data to be written have been finished (S435). When it is determined that the data to be written have been finished (S435: YES), reading section 220 reads the data freshness degree of a predetermined area ahead of a location where the last of the data is written. Skip recording section 320 then allows a data freshness degree that is higher than the read data freshness degree to be recorded in association with the last data (S437).

When it is not determined that the data to be written have not been finished (S435: NO), determining section 310 determines whether or not a fault had occurred in recording of the data (S440). When it is determined that a fault had occurred in recording of the data (S440: YES), reading section 220 reads a faulty portion freshness degree (S450). Subsequently, determining section 310 determines whether or not the data freshness degree immediately before the faulty portion is higher than the faulty portion freshness degree (S460). When it is determined that the data freshness degree immediately before the faulty portion is not higher than the faulty portion freshness degree (S460: NO), skip recording section 320 records a data freshness degree that is higher than the faulty portion freshness degree immediately before the faulty portion (S470).

As such, when a fault occurs in recording of data, tape drive 10 can disregard the faulty portion and can continue to record even if a written data freshness degree is erroneous.

Figure 6:
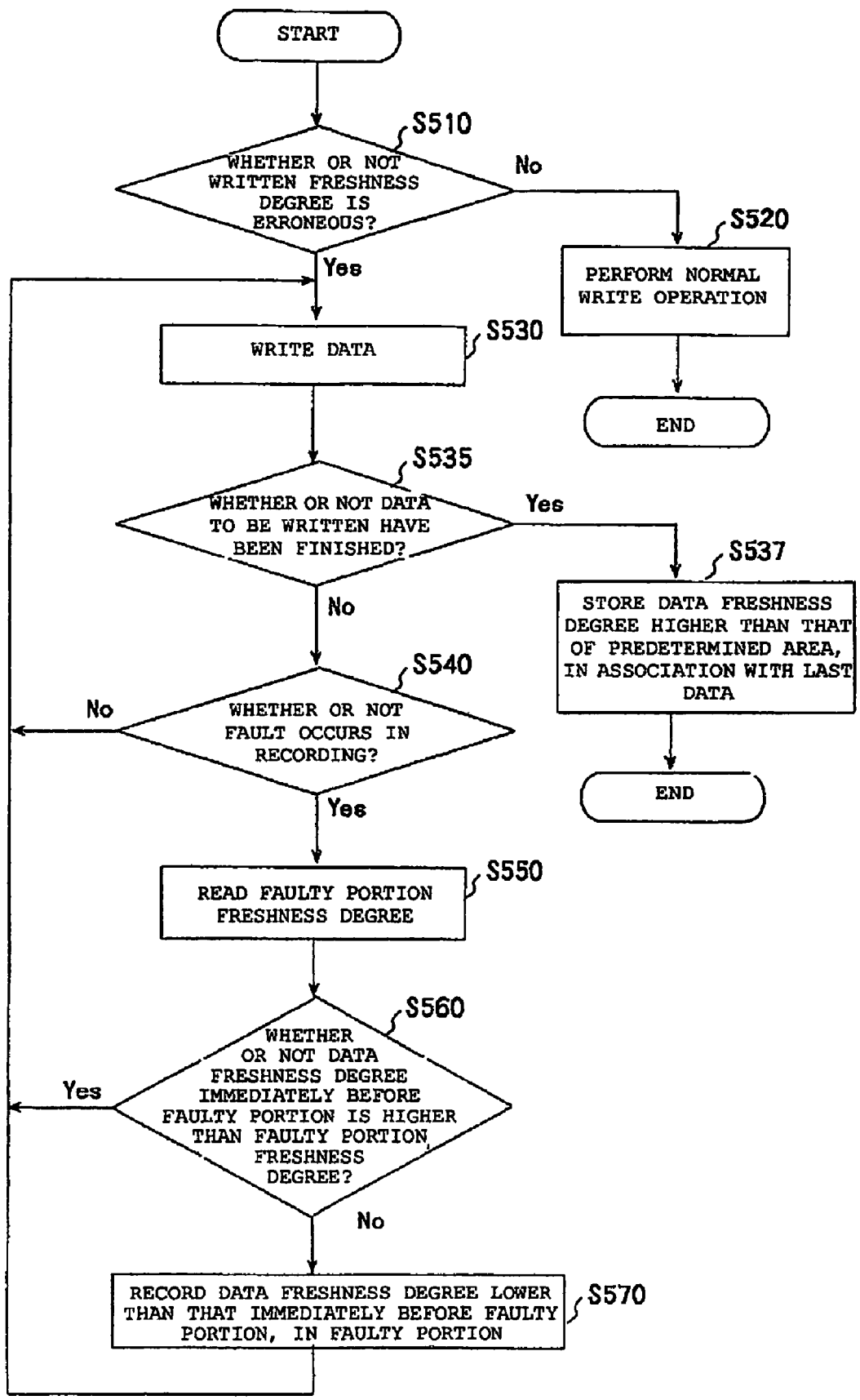
FIG. 6 is a flowchart of a method for recording data freshness degrees, in accordance with an alternative embodiment of the present invention.

FIG. 6 is a flowchart of a method for recording data freshness degrees by tape drive 10, in accordance with an alternative embodiment of the present invention. The operations in S510, S520, S530, S535, S537, S540, S550, and S560 shown in FIG. 6 are similar to those in S410, S420, S430, S435, S437, S440, S450, and S460 shown in FIG. 5, respectively. When the data freshness degree immediately before the faulty portion is not higher than the faulty portion freshness degree (S560: NO), skip recording section 320 records a data freshness degree that is lower than the data freshness degree recorded immediately before the faulty portion in the faulty portion (S570). As such, when a fault occurs, skip recording section 320, based on a faulty portion freshness degree, can allow a data freshness degree indicating that the data will be overwritten except the faulty portion to be recorded. Accordingly, tape drive 10 can disregard a faulty portion by additionally recording a data freshness degree in the faulty portion without rewinding the tape recording medium up to a portion immediately before the faulty portion.

Figure 7:
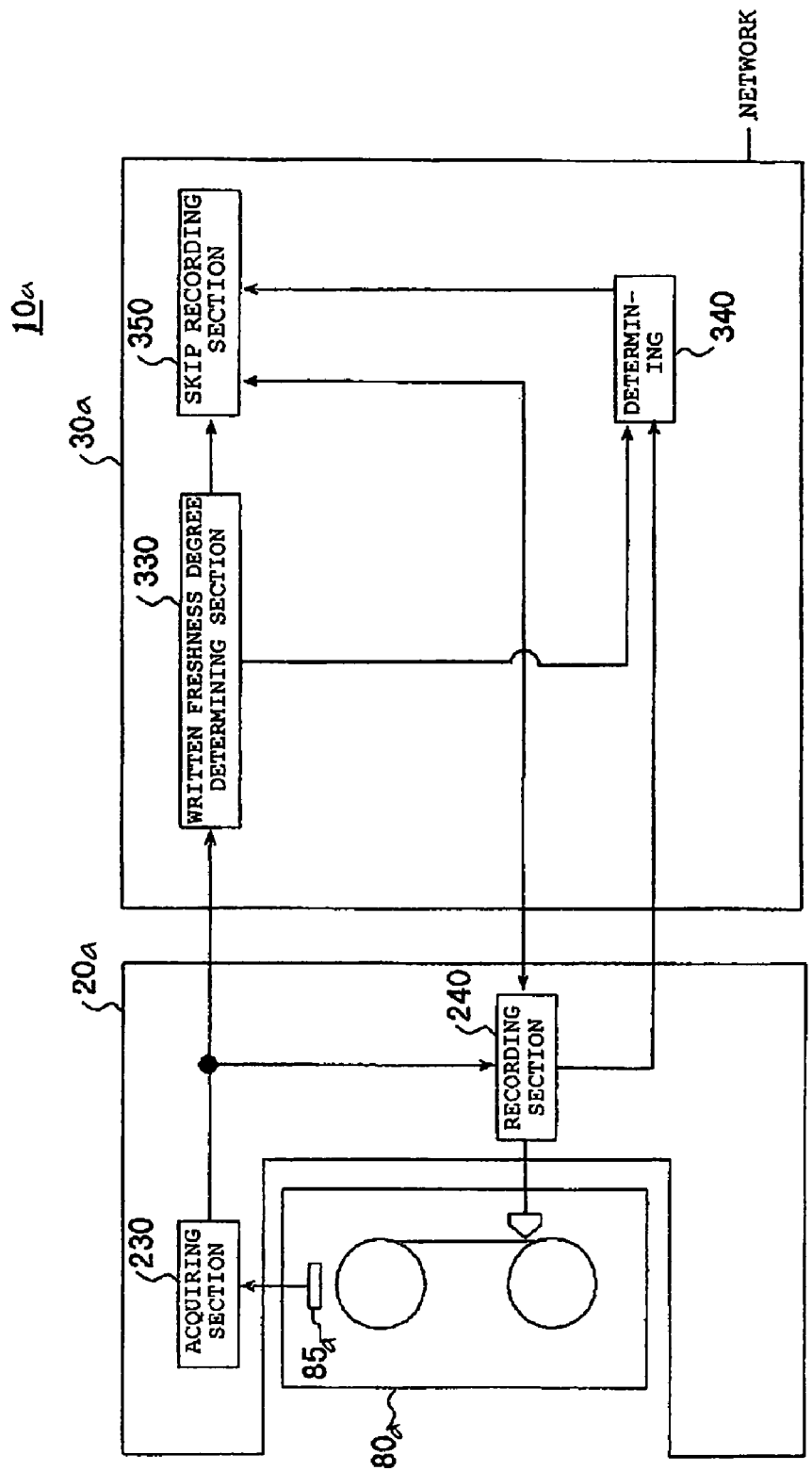
FIG. 7 is a block diagram of a tape drive, in accordance with an alternative embodiment of the present invention.

FIG. 7 is a block diagram of a tape drive, in accordance with an alternative embodiment of the present invention. As shown, a tape drive 10a includes a drive unit 20a and a control unit 30a. Drive unit 20a has an acquiring section 230 and a recording section 240. Control unit 30 has a written freshness degree determining section 330, a determining section 340 and a skip recording section 350. A tape recording medium 80a and written freshness degree storing section 85a are similar to those shown in FIG. 2. In addition, the operation of acquiring section 230 is substantially the same as the operation of acquiring section 200 in FIG. 2.

Recording section 240 receives written data freshness degrees from acquiring section 230 and skip recording section 350. When recording section 240 receives a written data freshness degree from skip recording section 350, recording section 240 performs recording using the received written data freshness degree. When recording section 240 does not receive a written data freshness degree from skip recording section 350, recording section 240 performs recording using a written data freshness degree received from acquiring section 230. Recording section 240 records any of the written data freshness degrees on tape recording medium 80a in association with data. Moreover, recording section 240 sends a data recording state (whether or not the recording has succeeded, whether or not data to be written have been finished, or the like) to determining section 340 and skip recording section 350.

As an initial operation when tape recording medium 80a is mounted, written freshness degree determining section 330 receives a written data freshness degree from acquiring section 230. Written freshness degree determining section 330 determines whether or not the written data freshness degree is erroneous. If the written data freshness degree is erroneous, written freshness degree determining section 330 sends a written freshness degree error notification to skip recording section 350.

Determining section 340 receives a data recording state from recording section 240. Determining section 340 then analyzes the data recording state and thereby determines whether or not a fault occurs in recording on tape recording medium 80a performed by recording section 240. When determining section 340 determines that a fault occurs in recording on tape recording medium 80a, determining section 340 sends a fault notification to skip recording section 350.

Skip recording section 350 receives a written freshness degree error notification from written freshness degree determining section 330. Moreover, skip recording section 350 receives a fault notification from determining section 340. When skip recording section 350 receives a written freshness degree error notification and a fault notification, skip recording section 350 receives a data recording state from recording section 240. Skip recording section 350 analyzes the data recording state and thereby specifies a data freshness degree recorded immediately before the faulty portion. Skip recording section 350 then sends recording section 240 a data freshness degree that is lower than the data freshness degree recorded immediately before the faulty portion, as a written data freshness degree, and allows recording section 240 to record the sent data freshness degree in the faulty portion.

Accordingly, when it is determined that a fault had occurred, skip recording section 350 can allow recording section 240 to record a value indicating that the faulty portion on tape recording medium 80a to retain the old invalid data.

Although skip recording section 350 uses a data freshness degree that is lower than the data freshness degree recorded immediately before a faulty portion as a value to be recorded in the faulty portion, the value to be recorded in the faulty portion is not limited to such. For example, skip recording section 350 may record a predetermined data pattern in a faulty portion. Skip recording section 350 may record a value such as separator 510 in FIG. 2 indicative of not being valid data. Skip recording section 350 may also record a Data Signal Separator (DSS) based on the LTO specifications as separator 510.

Figure 8:
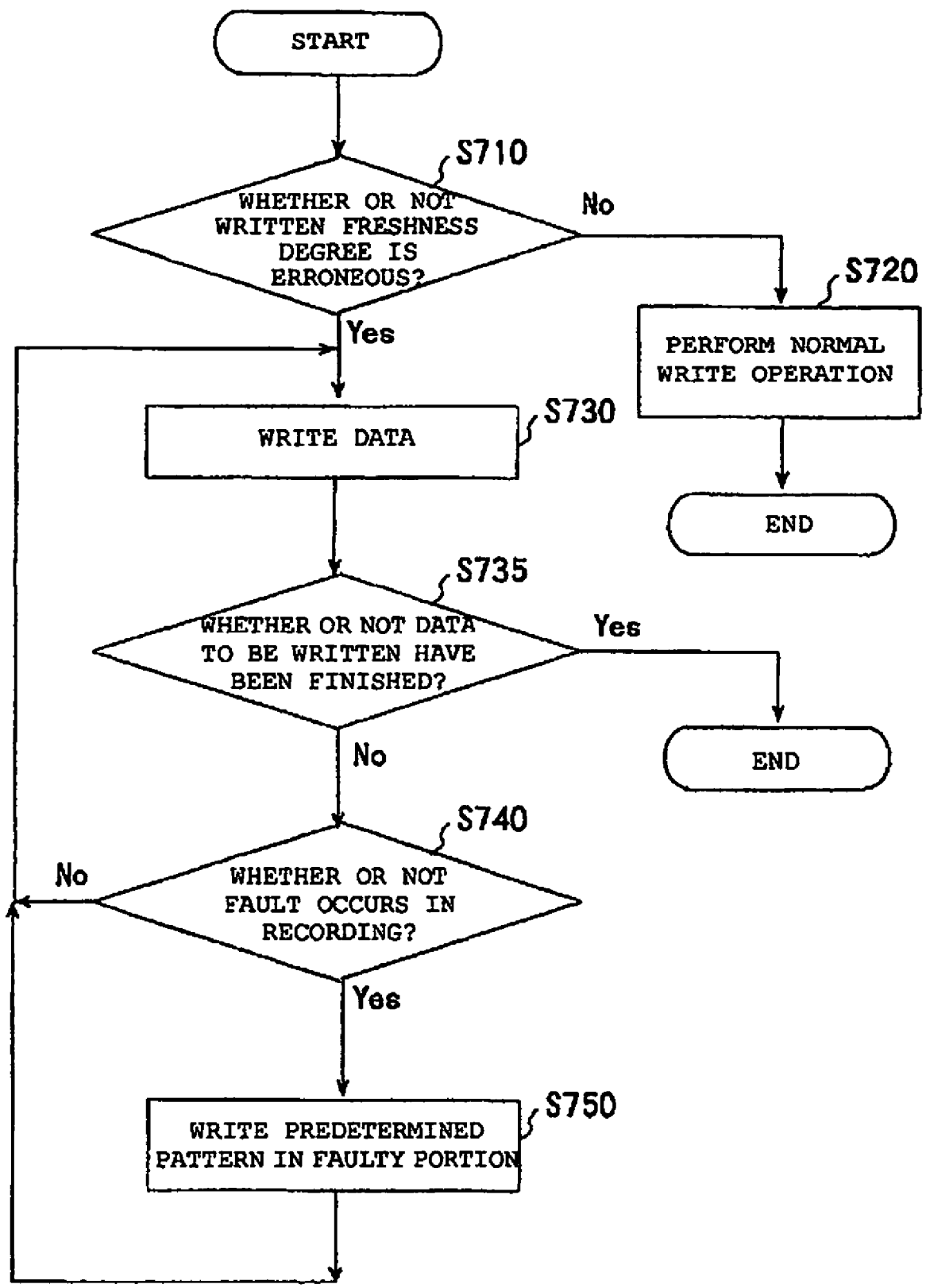
FIG. 8 is a method for recording data freshness degrees in the tape drive from FIG. 7.

FIG. 8 is a method for recording data freshness degrees in tape drive 10a. Written freshness degree determining section 330 determines whether or not a written data freshness degree is erroneous (S710). If written data freshness degree is not erroneous (S710: NO), tape drive 10a performs normal write operation (S720).

If written data freshness degree is erroneous (S710: YES), tape drive 10a repeats the following operations. Recording section 240 records data and the data freshness degree in association with the data (S730). More specifically, recording section 240 uses the written data freshness degree determined to be erroneous as an initial value of the data freshness degree. Alternatively, recording section 240 may use the duplicate written data freshness degree. Thereafter, recording section 240 sequentially records data freshness degrees so that the data freshness degrees become monotonically increasing in accordance with positions on the tape recording medium. Recording section 240 may use a predetermined value as the initial value of the data freshness degree. Subsequently, recording section 240 determines whether or not data to be written have finished (S735). When the data to be written have not finished (S735: NO), determining section 340 determines whether or not a fault occurs in recording of the data (S740). When a fault occurs in recording of the data, skip recording section 350 writes a predetermined pattern indicating that the faulty portion retains the old invalid data (S750).

As described above, tape drive 10a can record new data while making the new data distinguishable from the old data recorded in a faulty portion by additionally recording a predetermined pattern in the faulty portion, without reading the data freshness degree of the faulty portion.

Figure 9:
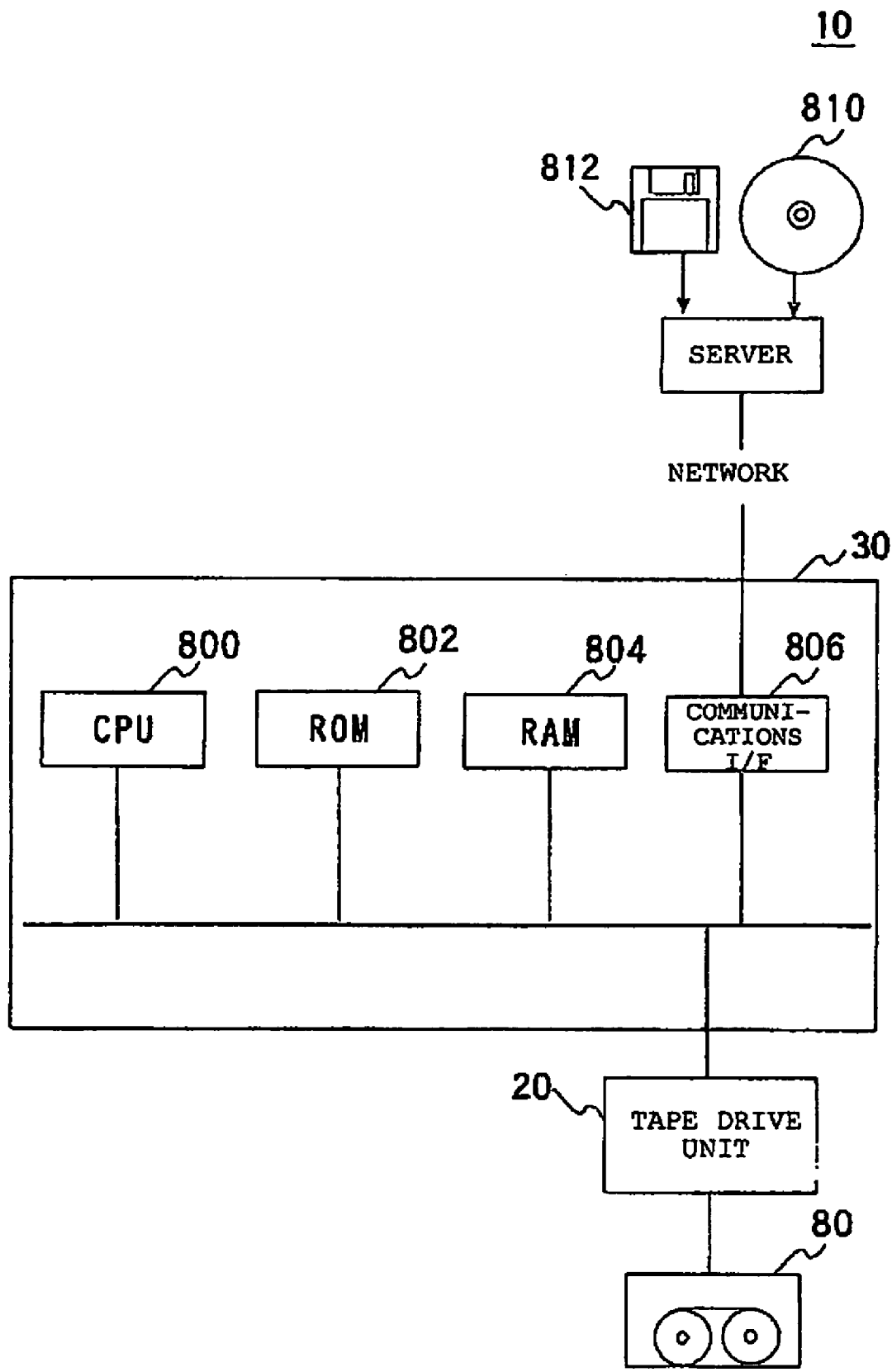
FIG. 9 is a block diagram of a computer system in which the tape drive from FIG. 1 can be incorporated.

FIG. 9 show a hardware configuration of tape drive 10 from FIG. 2, in accordance with a preferred embodiment of the present invention. Tape drive 10 includes drive unit 20 and control unit 30. The functions of control unit 30 are implemented by the cooperation of a computer and a program executed on the computer. The computer includes a central processing unit (CPU) 800, a read-only memory (ROM) 802, a random-access memory (RAM) 804, and a communications interface 806.

The program implementing control unit 30 includes a write freshness degree determining module, a determining module and a skip recording module. These modules are programs to cause the computer to function as the written freshness degree determining section 300, determining section 310, skip recording section 320, written freshness degree determining section 330, determining section 340, and skip recording section 350.

As described above, when a data freshness degree is defective, and at the same time, a fault occurs in recording of data, tape drive 10 carries out the operations, such as reading and writing, on a tape recording medium and thus disregards the faulty portion. For example, tape drive 10 records a data freshness degree that is higher than the data freshness degree of a faulty portion, immediately before the faulty portion. Then, using the data freshness degree that is higher than the data freshness degree of the faulty portion, tape drive 10 skips the faulty portion and continuously records data. Tape drive 10 can make the data freshness degree immediately before a faulty portion higher than the data freshness degree of the faulty portion. Accordingly, even when it is determined that a data freshness degree for use in overwrite recording is erroneous, tape drive 10 can make demarcation between a faulty portion, where already-recorded data remains, and new data.

Tape drive 10 performs the above-described recording operations limitedly in a narrow area, such as a faulty portion and its surrounding area on a tape. Therefore, tape drive 10 can effectively disregard a fault and continue recording.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for recording data by a tape drive, said method comprising:
   recording a set of data and a data freshness degree associated with said set of data on a tape recording medium, wherein said data freshness degree indicates how new said set of data is with respect to a set of previously-recorded data;
   determining whether or not a fault occurs during said recording of said set of data on said tape recording medium;
   in response to a determination that a fault occurs during said recording, reading a data freshness degree of data within a faulty portion on said tape recording medium in which said fault occurs; and
   recording said data freshness degree of said set of data immediately before said faulty portion on said tape recording medium, wherein said data freshness degree is higher than said data freshness degree of data within said faulty portion.

2. The method of claim 1, wherein said method further includes continuously recording data and data freshness degrees in portions subsequent to said faulty portion on said tape recording medium using a data freshness degree that is equal to or higher than said data freshness degree of said set of data immediately before said faulty portion.

3. The method of claim 1, wherein said method further includes in response to a last set of data to be sequentially recorded on said tape recording medium,
   reading a data freshness degree of a predetermined area ahead of a location on said tape recording medium in which said last set of data is recorded; and
   recording a data freshness degree of said last set of data, wherein said data freshness degree of said last set of data is higher than said data freshness degree of said predetermined area.

4. The method of claim 1, wherein said method further includes:
   acquiring a written data freshness degree from said tape recording medium; and
   determining whether or not said written data freshness degree is erroneous.

5. A tape drive comprising:
   means for recording a set of data and a data freshness degree associated with said set of data on a tape recording medium, wherein said data freshness degree indicates how new said set of data is with respect to a set of previously-recorded data;
   means for determining whether or not a fault occurs during said recording of said set of data on said tape recording medium;
   in response to a determination that a fault occurs during said recording, means for reading a data freshness degree of data within a faulty portion on said tape recording medium in which said fault occurs; and means for recording said data freshness degree of said set of data immediately before said faulty portion on said tape recording medium, wherein said data freshness degree is higher than said data freshness degree of data within said faulty portion.

6. The tape drive of claim 5, wherein said tape drive further includes means for continuously recording data and data freshness degrees in portions subsequent to said faulty portion on said tape recording medium using a data freshness degree that is equal to or higher than said data freshness degree of said set of data immediately before said faulty portion.

7. The tape drive of claim 5, wherein said tape drive further includes in response to a last set of data to be sequentially recorded on said tape recording medium,
means for reading a data freshness degree of a predetermined area ahead of a location on said tape recording medium in which said last set of data is recorded; and
means for recording a data freshness degree of said last set of data, wherein said data freshness degree of said last set of data is higher than said data freshness degree of said predetermined area.

8. The tape drive of claim 5, wherein said tape drive further includes:
means for acquiring a written data freshness degree from said tape recording medium; and
means for determining whether or not said written data freshness degree is erroneous.

* * * * *